S. D. HOWELL.
SIGNAL DEVICE.
APPLICATION FILED MAR. 12, 1917.
1,299,473.
Patented Apr. 8, 1919.
2 SHEETS—SHEET 2.
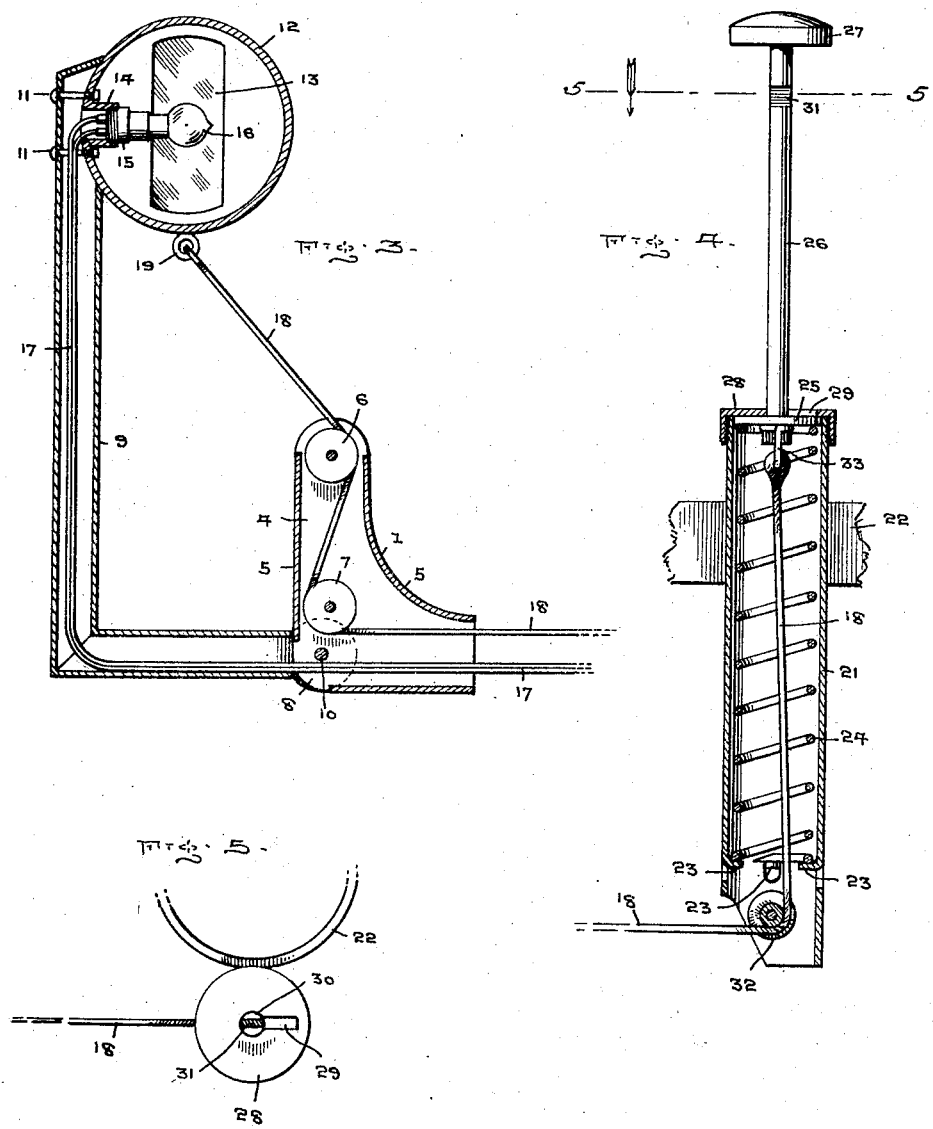

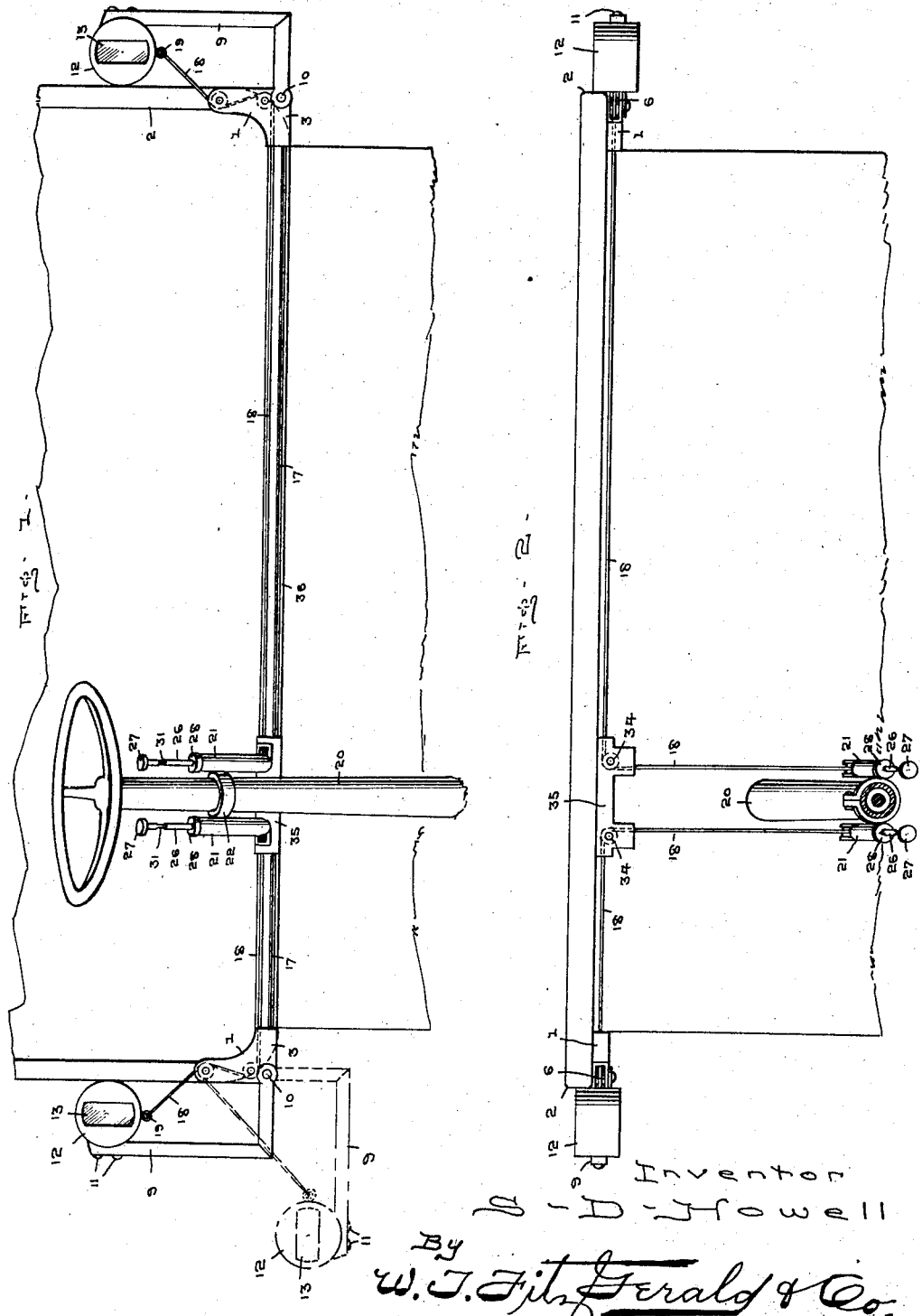

UNITED STATES PATENT OFFICE.

SAMUEL D. HOWELL, OF OKLAHOMA, OKLAHOMA.

SIGNAL DEVICE.

1,299,473.  Specification of Letters Patent.  Patented Apr. 8, 1919.

Application filed March 12, 1917. Serial No. 154,126.

*To all whom it may concern:*

Be it known that I, SAMUEL D. HOWELL, a citizen of the United States, residing at Oklahoma, in the county of Oklahoma and State of Oklahoma, have invented certain new and useful Improvements in Signal Devices; and I do hereby declare the following to be a full, clear, and exact description of the invention, such as will enable others skilled in the art to which it appertains to make and use the same.

This invention relates to new and useful improvements in signaling devices, and has for its principal object to provide a device of this character which is of cheap and inexpensive construction and which may be readily attached to a motor vehicle and so arranged that it can be quickly and conveniently operated by the motor vehicle operator to indicate the direction in which the vehicle to be steered.

Another object of the invention is to pivotally mount a gravity signal arm at each side of the motor vehicle and to provide means attached to the steering post adapted to be actuated to elevate the signal arm, said signal arm being adapted to gravitate to a horizontal or lowered position upon the release of the actuating means.

Another object of the invention is to pivotally mount a tubular angular signal arm upon each side of the motor vehicle windshield, a lamp casing being attached to the outer end of each arm and having a lamp arranged therein, the wires leading to the lamp extending through the tubular arm, said lamp casing being provided in its opposite sides with elongated translucent strips of glass whereby the light may be seen from the front and rear of the vehicle.

A still further object of the invention is to provide a signaling device which may be attached either to a right or left hand drive motor vehicle and may be selectively operated manually or by the foot to indicate the direction in which the vehicle is to be turned.

With these and other objects in view, the invention comprises various novel features of construction, combination, and arrangement of parts as will be more fully described hereinafter and set forth with particularity in the appended claim.

Referring to the drawings,

Figure 1 is a front elevation of a fragmentary portion of a motor vehicle dash, windshield and steering post, showing my improved signaling device attached thereto, Fig. 2 is a sectional plan view of the device, Fig. 3 is a vertical sectional view taken through one of the signal arms and its supporting bracket, Fig. 4 is a vertical sectional view through one of the plunger casings, and Fig. 5 is a sectional plan view taken on the line 5—5 of Fig. 4.

Similar characters of reference are used to denote like parts throughout the drawings and the following specification.

Referring particularly to the drawings, 1 indicates a supporting bracket, one of these brackets being attached to each lower corner of the windshield frame 2. As these brackets are identical in construction, a description of one will suffice for both. Each bracket is of substantially right angular construction and comprises inner and outer plates 3 and 4, which are held in spaced relation to each other by end walls 5. Guide rollers 6 and 7 are pivotally mounted between the inner and outer plates, the roller 6 being mounted at the upper end of the bracket while the roller 7 is mounted adjacent the bottom of the bracket.

The lower corners of the end walls 5 are cut away as at 8 to provide an entrance passage. The signaling arms are identical in construction as will be seen by reference to Fig. 3, and each comprises a right angular tubular arm 9, the lower end pivotally attached as at 10 to the outer sides of the plates 3 and 4, while the outer or free end of the arm has suitably attached thereto, by bolts or other suitable fastening means 11, a lamp casing 12 preferably of circular formation. This casing 12 is provided in its opposite side faces with elongated translucent strips of glass 13, extending longitudinally in the same direction as the longer branch of the signal arm.

Referring particularly to Fig. 3, it will be noted that the lamp casing 12 is formed with an inwardly and radially projecting socket 14 into which is threaded a lamp socket 15, carrying an incandescent lamp 16 disposed centrally between the translucent glasses 13. Electrical wires 17 are extended from a suitable source of current horizontally through the lower portion of the supporting bracket 1 through the passage 8, and into the tubular arm 9, from whence they are carried through the arm and connected to the lamp 16 through the socket 15. By this construction it will be apparent that the electric wires are inclosed and out of sight so as to be protected from the weather and out of the way.

By the construction of the signal arm, it will be manifest that the lamp casing 12 mounted on the outer end thereof is of sufficient weight to cause the arm to gravitate to a lowered or horizontal position, as indicated in dotted lines in Fig. 1. In order that the signal arm may be quickly and readily raised to a vertical position, or a position parallel with the sides of the windshield, I attach a pull cable 18 to the casing 12 as at 19, this cable being extended around the pulley 6 and thence oppositely around the pulley 7 and then horizontally and inwardly to a position adjacent the vehicle steering post 20.

Arranged on each side of the steering post 20 is a plunger casing 21 that is attached to a clamping collar 22 clamped around the steering post. Each of these cylinders 21 is cylindrical in form and is struck inwardly at points adjacent its lower end to provide a plurality of lugs 23 upon which is arranged an expansion coil spring 24, the upper end of this spring bearing upward on the bottom of a plunger head 25 carried by the lower end of a plunger rod 26, said rod being provided with a hand knob 27. The upper end of each cylinder is closed by a cap 28 which is threaded on the casing, but if desired may be attached in any suitable manner. This cap is provided with a radially extending slot 29 which communicates with an aperture 30 through the center of the cap. The plunger rod 26 is cut away on its opposite sides at points adjacent the knob 27 to provide a flat shank portion 31, which, when the plunger is depressed, may be moved laterally into the slot 29 so as to hold the plunger in depressed position.

The cable 18 is extended from the supporting bracket 1 to the plunger casing 21, where it is trained around a pulley 32 mounted in the lower end of the plunger casing, and from this pulley the cable is extended upwardly through the cylinder and attached to an eye 33 secured to the bottom of the plunger head 25.

In order that the cables 18 may be attached to the lower ends of the plunger rods 26 in alinement with the direction of movement thereof, they are each trained around pulleys 34 that are mounted in a substantially U-shaped casing 35 attached to the lower horizontal strip 36 of the windshield frame at a point directly in front of the steering post 20 as seen in Fig. 2.

In the operation of the device it will be noted that when the motor vehicle operator desires to show that he proposes to bring the vehicle to a standstill, he simply depresses one or both of the plunger rods 26 and engages the shank 31 in the slot 29 so as to hold the plunger in depressed position, which will allow each or both, as the case may be, of the signal arms to gravitate to a lowered or horizontal position, said arms being prevented from gravitating downwardly too far by the slack being taken up out of the cables 18.

When it is desired to turn to the right or left, the signal arm to the right or left, depending upon direction in which the vehicle is to be turned, is lowered and raised by simply depressing the plunger rod 26 and immediately releasing it whereupon the expansive force of the spring 24 will immediately elevate the signal arm into the position shown in the drawings.

When the vehicle is going straight ahead, both of the signal arms are designed to be arranged in a vertical position as shown in Fig. 1 of the drawing. The device may be readily and quickly operated at all times and is so positioned and arranged as to be within easy reach of the vehicle operator and yet will not in any way obscure his line of vision.

What I claim is:

A signal device comprising an L-shaped bracket casing, a pair of pulleys mounted in said casing in spaced vertical alinement, an L-shaped tubular gravity signal arm having its inner end provided with a pair of spaced ears pivotally connected to the lower corner of said casing bracket, a lamp casing projecting laterally from the outer end of said tubular signal arm and having communication with the interior of said signal arm, a cable having one end fixed to said lamp casing and trained over and under said pulleys and through said bracket casing, and means connected to said cable whereby the tubular signal arm may be raised and lowered.

In testimony whereof I have signed my name to this specification in the presence of two subscribing witnesses.

SAMUEL D. HOWELL.

Witnesses:
 BESS OLSON,
 GEORGE HALL.

Copies of this patent may be obtained for five cents each, by addressing the "Commissioner of Patents, Washington, D. C."